United States Patent
Isobe

(10) Patent No.: US 12,501,154 B2
(45) Date of Patent: Dec. 16, 2025

(54) IMAGE PROCESSING APPARATUS, IMAGE CAPTURING APPARATUS, INFORMATION PROCESSING METHOD, AND STORAGE MEDIUM

(71) Applicant: CANON KABUSHIKI KAISHA, Tokyo (JP)

(72) Inventor: Shingo Isobe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 62 days.

(21) Appl. No.: 18/678,073

(22) Filed: May 30, 2024

(65) Prior Publication Data

US 2024/0414438 A1  Dec. 12, 2024

(30) Foreign Application Priority Data

Jun. 6, 2023  (JP) ................ 2023-093306

(51) Int. Cl.
| | |
|---|---|
| *H04N 23/67* | (2023.01) |
| *G06T 5/60* | (2024.01) |
| *G06T 5/70* | (2024.01) |
| *H04N 23/60* | (2023.01) |
| *H04N 23/63* | (2023.01) |

(52) U.S. Cl.
CPC ............ *H04N 23/673* (2023.01); *G06T 5/60* (2024.01); *G06T 5/70* (2024.01); *H04N 23/635* (2023.01); *H04N 23/64* (2023.01); *H04N 23/672* (2023.01); *G06T 2207/20084* (2013.01)

(58) Field of Classification Search
CPC .... H04N 23/673; H04N 23/635; H04N 23/64; H04N 23/672; G06T 5/60; G06T 5/70; G06T 2207/20084; G06T 2207/20081
USPC ............................................. 348/241
See application file for complete search history.

(56) References Cited

U.S. PATENT DOCUMENTS

| | | | | |
|---|---|---|---|---|
| 2009/0073288 | A1* | 3/2009 | Tsuruoka | H04N 19/117 348/241 |
| 2020/0293803 | A1* | 9/2020 | Wajs | G06V 10/95 |
| 2023/0247308 | A1* | 8/2023 | Yang | H04N 25/10 348/222.1 |
| 2023/0351719 | A1* | 11/2023 | Raj | G06N 3/045 |

FOREIGN PATENT DOCUMENTS

| | | |
|---|---|---|
| JP | 2008292541 A | 12/2008 |
| JP | 6758964 B2 | 9/2020 |
| JP | 6931306 B2 | 9/2021 |
| JP | 2022011099 A | 1/2022 |

\* cited by examiner

*Primary Examiner* — Usman A Khan
(74) *Attorney, Agent, or Firm* — Cowan, Liebowitz & Latman, P.C.

(57) ABSTRACT

There is provided with an image processing apparatus. A first generating unit generates an attention map indicating a region having a specific spatial frequency from a first image that is captured by an image capturing apparatus. An outputting unit outputs, based on the first image and the attention map, a second image in which noise has been reduced from the first image by using a trained machine learning model. A second generating unit generates, based on the second image and the attention map, information for adjusting focus of the image capturing apparatus.

18 Claims, 16 Drawing Sheets

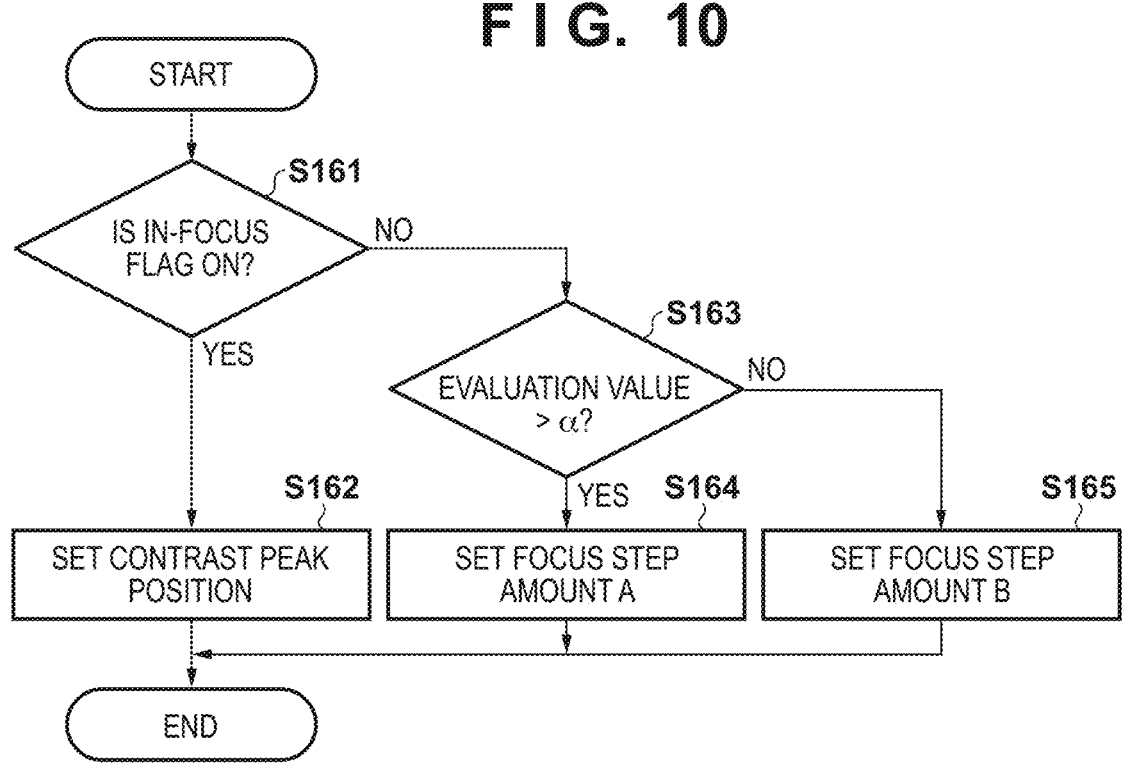
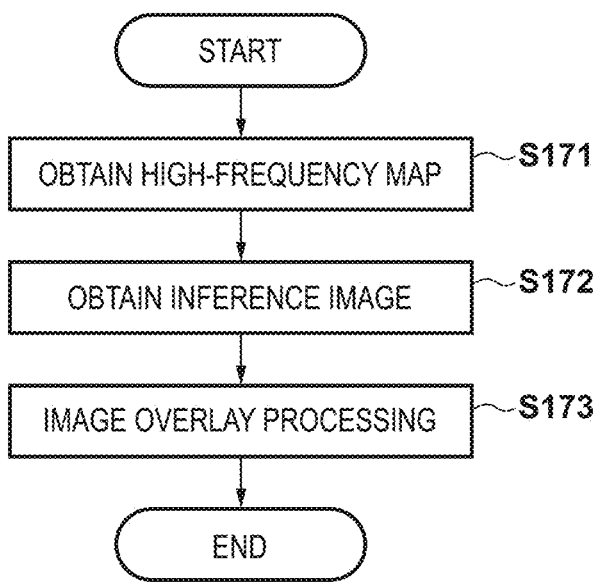

FIG. 12
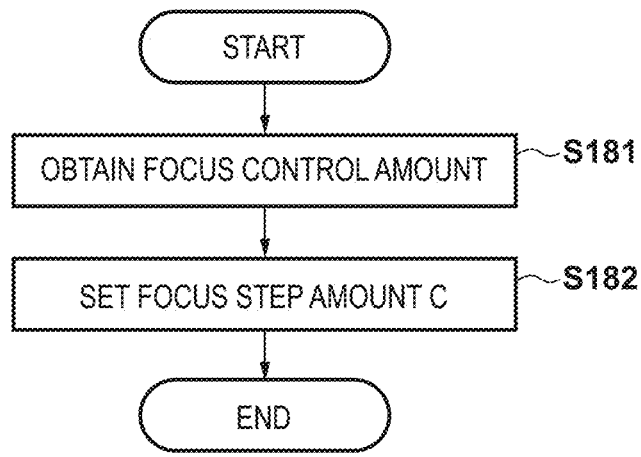
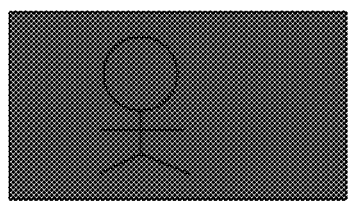
FIG. 13A
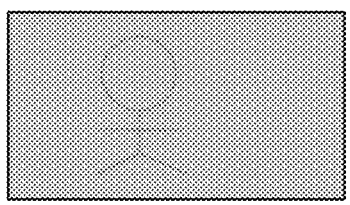
FIG. 13B
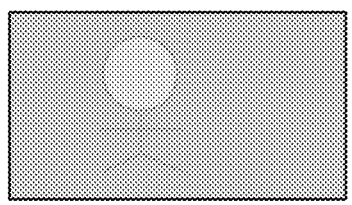
FIG. 13C
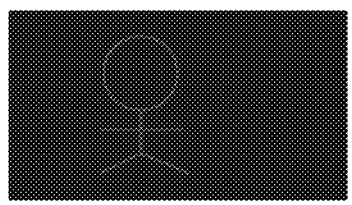
FIG. 13D
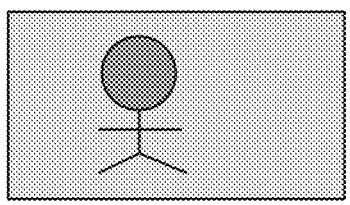
FIG. 13E
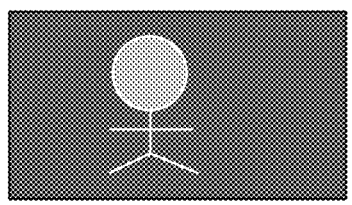
FIG. 13F
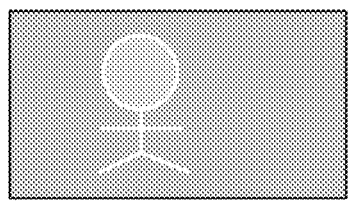
FIG. 13G

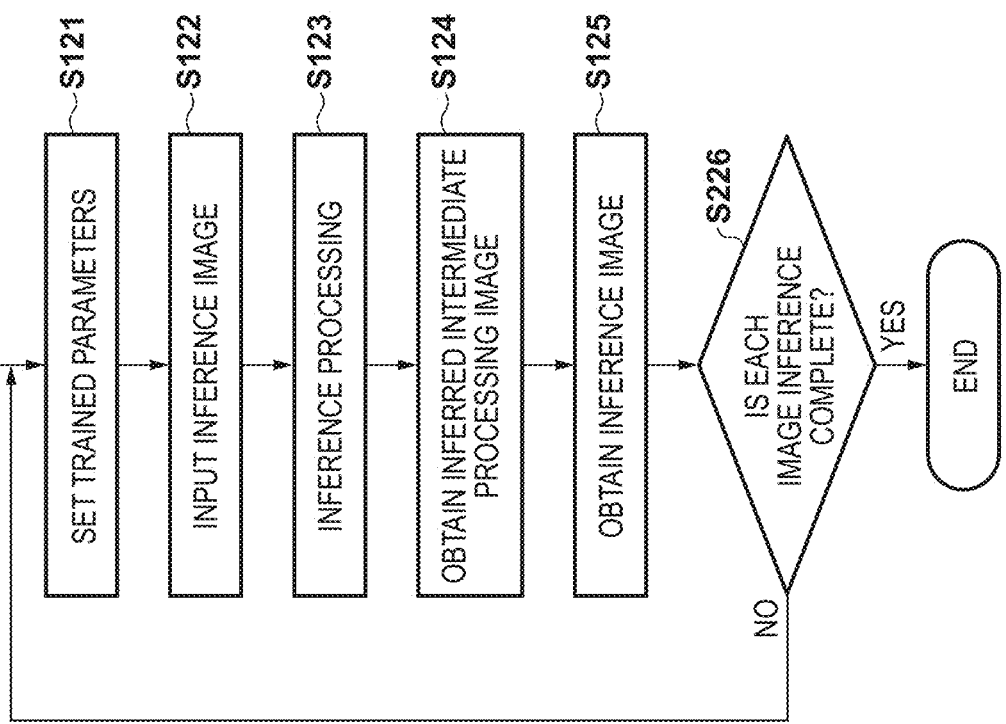
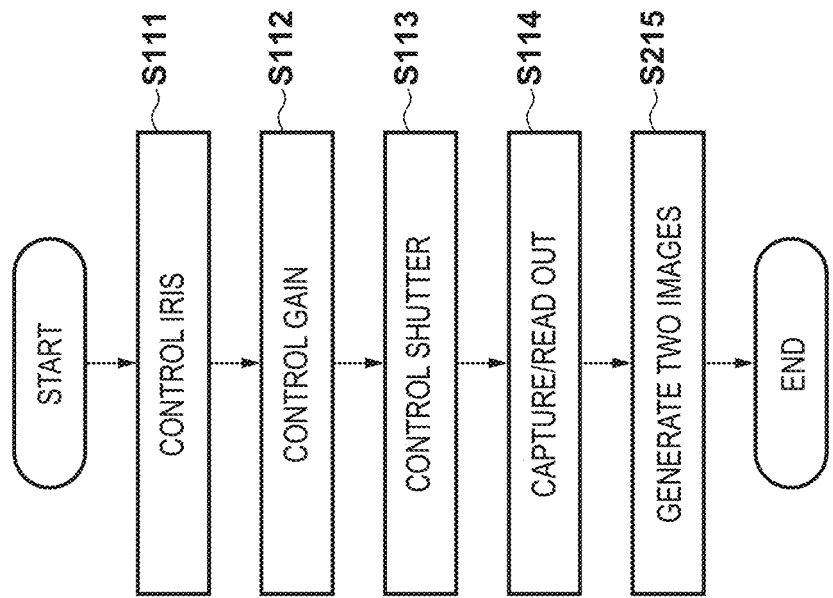

IMAGE PROCESSING APPARATUS, IMAGE CAPTURING APPARATUS, INFORMATION PROCESSING METHOD, AND STORAGE MEDIUM

BACKGROUND OF THE INVENTION

Field of the Invention

The present invention relates to an image processing apparatus, an image capturing apparatus, an information processing method, and a storage medium.

Description of the Related Art

In ultra-low-light environments found in surveillance applications, there is a need to improve the visibility of target subjects. An extremely high gain may therefore be employed when shooting with a camera. For example, the gain is sometimes increased by prioritizing the visibility of the subject, even at the expense of the quality of the image used for viewing. When using autofocus ("AF" hereinafter) in such a scene, focus detection is considered difficult because the evaluation value for the focus detection fluctuates more than in normal situations.

AF methods include a contrast-based method, in which a high-frequency component of an image is used as the focus evaluation value, and a phase detection method, in which the light flux entering the image sensor is split to form two images and the focus is then evaluated by finding a defocus amount from a phase difference between the two images. Japanese Patent Laid-Open No. 2008-292541 discloses a technique for implementing noise reduction processing ("NR" hereinafter) in an early stage of focus detection processing, where focusing is performed using a noisy subject by adjusting a focus determination threshold according to the strength of the NR. Japanese Patent Laid-Open No. 2022-11099 discloses a technique in which AF is instructed to be started when the total number of times an amount of change in past predetermined frames has reached or exceeded a threshold, has itself reached or exceeded a threshold, which reduces the effects of fluctuations in noise and improves the stability of the AF.

Japanese Patent No. 6931306 discloses an image shift amount calculation apparatus in which two images are prepared, at a first level and at a second level reduced in length and width, for the purpose of correlation computation, and performs correlation computation using the two-image data from the second level when a large amount of noise is present. Additionally, according to the technique described in Japanese Patent No. 6758964, a reference value for reliability determination, calculated when computing a correlation, is changed in accordance with the amount of noise. AF is performed using the contrast-based method in Japanese Patent Laid-Open No. 2008-292541 and Japanese Patent Laid-Open No. 2022-11099, whereas AF is performed using the phase detection method in Japanese Patent No. 6931306 and Japanese Patent No. 6758964.

SUMMARY OF THE INVENTION

According to one embodiment of the present invention, an image processing apparatus comprises: a first generating unit configured to generate, from a first image that is input, an attention map indicating a region having a specific spatial frequency; an outputting unit configured to output, based on the first image and the attention map, a second image in which noise has been reduced from the first image by using a trained machine learning model; and a second generating unit configured to generate, based on the second image and the attention map, information for adjusting focus of an image capturing apparatus.

According to another embodiment of the present invention, an image capturing apparatus comprises: an image capturing unit configured to capture a first image; a first generating unit configured to generate an attention map indicating a region having a specific spatial frequency, using the first image as an input; an outputting unit configured to output, based on the first image and the attention map, a second image in which noise has been reduced from the first image by using a trained machine learning model; and a second generating unit configured to generate, based on the second image and the attention map, information for adjusting focus in image capturing.

According to yet another embodiment of the present invention, an image processing method comprises: generating, from a first image that is input, an attention map indicating a region having a specific spatial frequency; outputting, based on the first image and the attention map, a second image in which noise has been reduced from the first image by using a trained machine learning model; and generating, based on the second image and the attention map, information for adjusting focus of an image capturing apparatus.

According to still another embodiment of the present invention, a non-transitory computer-readable storage medium stores a program that, when executed by a computer, causes the computer to perform an image processing method, the image processing method comprising: generating, from a first image that is input, an attention map indicating a region having a specific spatial frequency; outputting, based on the first image and the attention map, a second image in which noise has been reduced from the first image by using a trained machine learning model; and generating, based on the second image and the attention map, information for adjusting focus of an image capturing apparatus.

According to yet another embodiment of the present invention, a non-transitory computer-readable storage medium stores a program that, when executed by a computer, causes the computer to perform an image processing method, the image processing method comprising: capturing a first image; generating an attention map indicating a region having a specific spatial frequency, using the first image as an input; outputting, based on the first image and the attention map, a second image in which noise has been reduced from the first image by using a trained machine learning model; and generating, based on the second image and the attention map, information for adjusting focus in image capturing.

Further features of the present invention will become apparent from the following description of exemplary embodiments (with reference to the attached drawings).

BRIEF DESCRIPTION OF THE DRAWINGS

FIG. 10 is a flowchart illustrating an example of AF target value setting processing according to the first embodiment.

FIG. 11 is a flowchart illustrating an example of MF assist image overlay processing according to the first embodiment.

FIG. 12 is a flowchart illustrating an example of MF operation amount setting processing according to the first embodiment.

FIGS. 13A to 13G are diagrams illustrating an example of an image according to the first embodiment.

FIG. 16 is a flowchart illustrating an example of image capture processing according to the second embodiment.

FIG. 17 is a flowchart illustrating an example of noise reduction processing according to the second embodiment.

DESCRIPTION OF THE EMBODIMENTS

Figure 1:
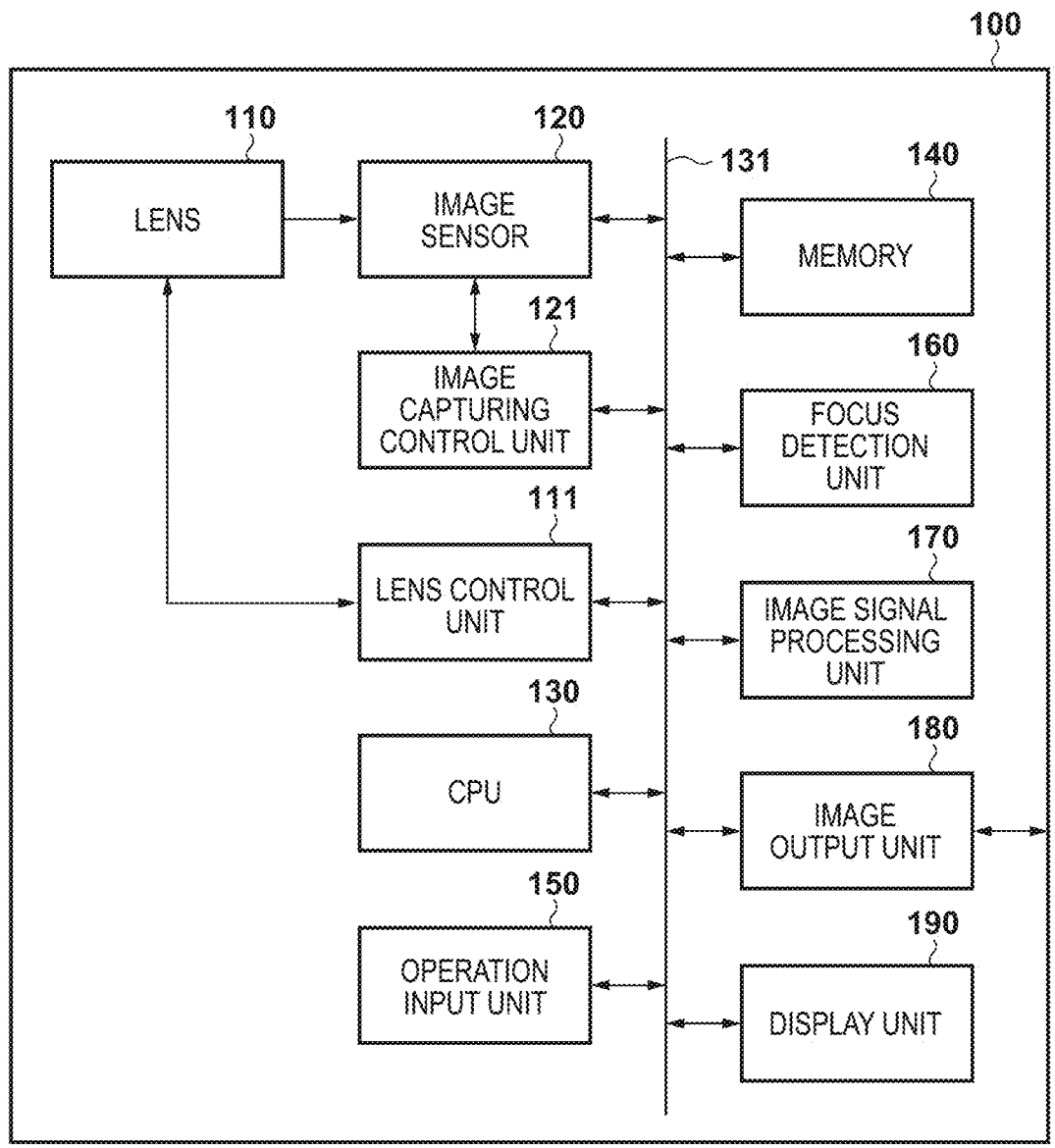
FIG. 1 is a block diagram illustrating an example of the hardware configuration of an image processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

However, the techniques described in the patent literature mentioned above cannot completely remove noise, resulting in the focus evaluation value fluctuating more than usual. This in turn causes the AF to stop due to blurring, or the AF not functioning to begin with. For example, noise may not be completely removed from high-gain, high-noise images.

Embodiments of the present invention provide an image processing apparatus that provides information useful for adjusting the focus while reducing noise in an image.

First Embodiment

An image processing apparatus according to the present embodiment is used in image processing in which, for example, a neural network ("NN" hereinafter) is used to infer a desired output image from an input image, and focus evaluation and AF are performed using a high-frequency component from the inferred image. When training the NN, a plurality of unlabeled images and corresponding labeled images are prepared, and network parameters such as weights or biases are optimized through training which, for example, brings the feature distribution of the unlabeled images closer to the feature distribution of the labeled images. This enables accurate inferences even for input images not subjected to training.

The image processing apparatus according to the present embodiment performs inference on an unknown noise input image as an early stage of processing to obtain an inference image with reduced noise, and, using the inference image, generates information for adjusting the focus of an image capturing apparatus as a later stage of processing. In particular, AF processing is performed by the image capturing apparatus in the later stage of the processing.

FIG. 1 is a block diagram illustrating an example of the hardware configuration of an image processing apparatus 100 having an image capturing function according to the present embodiment. Although the image processing apparatus 100 according to the present embodiment will be described as being a digital video camera having a built-in lens, the apparatus is not limited to this structure as long as the processing described later can be performed. For example, the image processing apparatus 100 may be an interchangeable lens-type image processing apparatus, such as an interchangeable lens-type video camera, single-lens reflex camera, or mirrorless single-lens camera.

Although described as being an image capturing apparatus having an image capturing function, the image processing apparatus 100 according to the present embodiment may be an image processing apparatus which does not have an image capturing function and which is connected to an external image capturing apparatus (not shown). In this case, it is assumed that instead of capturing an image, the image processing apparatus 100 obtains the image from the exterior and stores the image in a memory 140 (described later).

The image processing apparatus 100 includes a lens 110, a lens control unit 111, an image sensor 120, and an image capturing control unit 121 as functional units for capturing images. The image processing apparatus 100 forms an image from a light flux incident from the exterior on the image sensor 120 through the lens 110. The lens 110 is a lens constituted by a zoom lens group (not shown), a focus lens group, an iris mechanism, and the like, and is controlled by the lens control unit 111. The image processing apparatus 100 can also change an accumulation time for which the image sensor 120 is exposed, and can apply a gain to a shot image read out from the image sensor 120. These functions of the image sensor 120 are controlled by the image capturing control unit 121.

The image processing apparatus 100 also includes a CPU 130, the memory 140, an operation input unit 150, a focus detection unit 160, an image signal processing unit 170, an image output unit 180, and a display unit 190. The CPU 130 is a central processing unit that executes processing in accordance with programs and various types of data stored in the memory 140, and can execute various types of processing (described later). The CPU 130 is connected to the image capturing control unit 121 and the lens control unit 111 by a bus 131, and can control the lens 110 and the image sensor 120 in real time. The shot image exposed by the image sensor 120 is stored in the memory 140 through the bus 131. The memory 140 is storage such as a ROM or a RAM, and stores programs and data necessary for processing.

The operation input unit 150 includes a focus demand, a volume, a switch, and the like (not shown), and obtains inputs from a user. The operation input unit 150 can make various types of operation instructions for the image processing apparatus 100 in response to user inputs, such as executing operations of the lens 110, changing the exposure time, gain, or the like of the image sensor 120, and the like. Operation signals input by the operation input unit 150 are processed by the CPU 130 and converted into commands and control signals processed by the image capturing control unit 121 or the lens control unit 111.

The focus detection unit 160 performs focus detection from the shot image stored in the memory 140. The image signal processing unit 170 reads and writes images from and to the memory 140, performs image development processing, NR processing (described later), user interface ("UI" hereinafter) image generation processing for displaying images in a UI, and the like, and stores the images in the memory 140 again.

The image output unit 180 outputs the image processed by the image signal processing unit 170 and stored in the memory 140 to the exterior of the image processing apparatus 100. An output image signal output from the image output unit 180 is output to the exterior from an HDMI (registered trademark) terminal or an SDI terminal (not shown) provided in the image processing apparatus 100. The display unit 190 displays various types of content in a display such as a panel or a viewfinder (not shown) provided in the image processing apparatus 100. The display unit 190 according to the present embodiment can display a UI image overlaid on an image expressed by the aforementioned output image signal, for example.

The user of the image processing apparatus 100 according to the present embodiment captures an image after adjusting the focus of a subject using AF and manual focus ("MF" hereinafter) while viewing the image and the UI image in the display unit 190. When performing AF, the user can execute the AF by operating a switch using the aforementioned operation input unit 150. An assist image (assist UI) for the MF (described later) is displayed as the UI image.

Although FIG. 1 illustrates the functional units separately as elements corresponding to the respective functions, the functional units may be implemented by hardware such as one or more ASICs, programmable logic arrays (PLAs), or the like. Furthermore, the processing performed by the image processing apparatus 100 according to the present embodiment may be realized by software executed by the CPU or a programmable processor such as an MPU.

Figure 2:
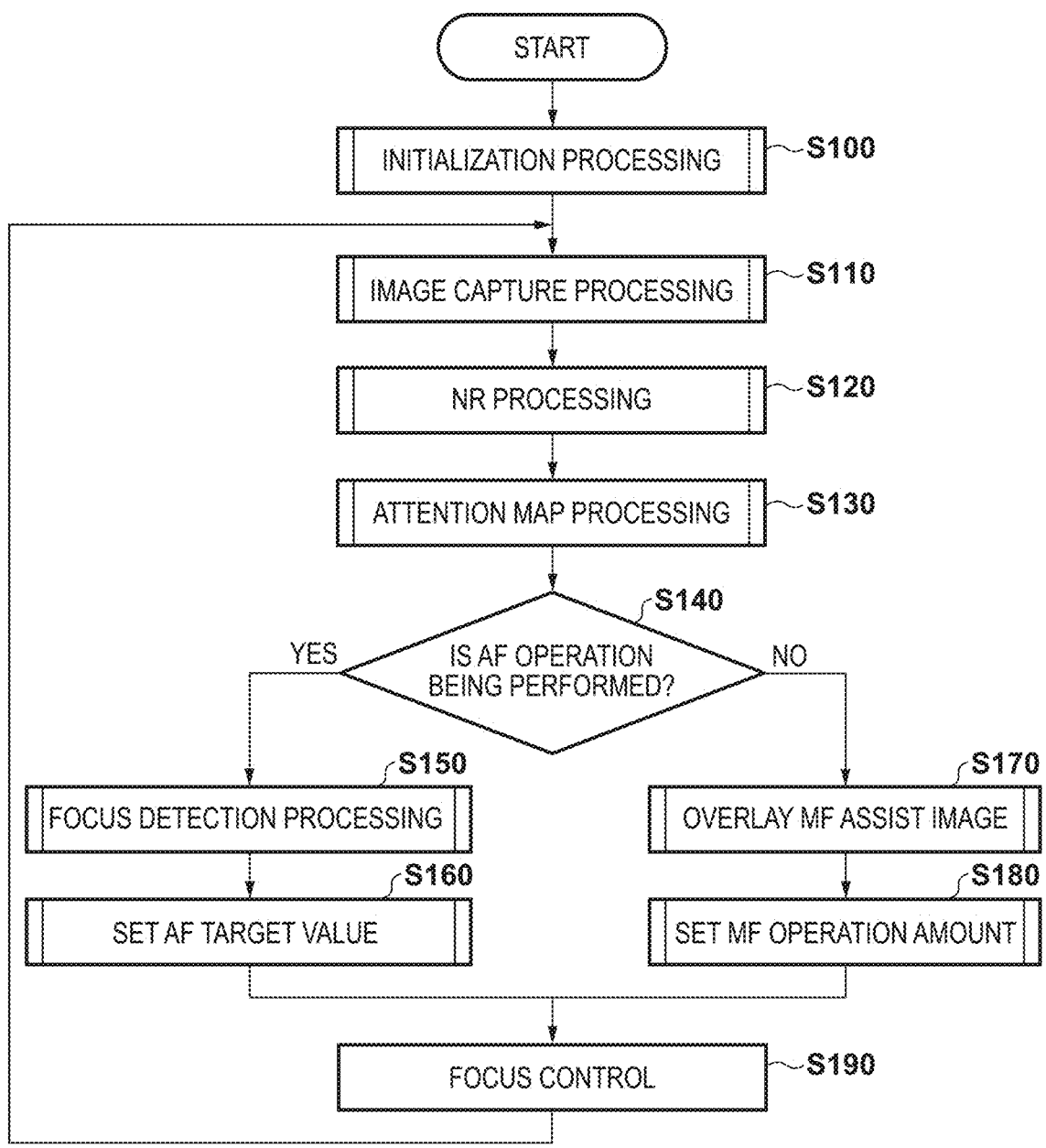
FIG. 2 is a flowchart illustrating an example of overall processing according to the first embodiment.

An example of the AF processing performed by the CPU 130 of the image processing apparatus 100 will be described next with reference to the flowchart in FIG. 2. In the present embodiment, when the image processing apparatus 100 is turned on, a computer program is read out from the memory 140 to the CPU 130, and processing is executed in order from step S100 in FIG. 2. Although the processing loop from step S110 starts again once the processing up to step S190 in FIG. 2 is executed, the processing from steps S110 to S190 is performed on a frame-by-frame basis for the image input for processing.

Figure 3:
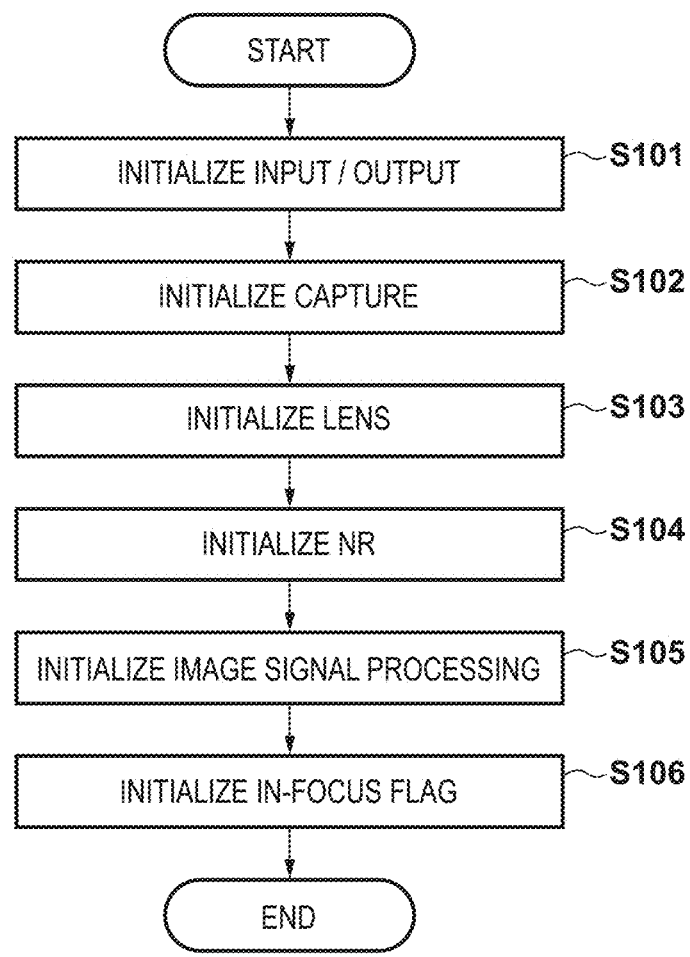
FIG. 3 is a flowchart illustrating an example of initialization processing according to the first embodiment.

In step S100, the CPU 130 performs initialization processing for the image processing apparatus 100. The subroutine of step S100 is illustrated in FIG. 3. The processing involved in step S100 can use any publicly-known initial setting processing performed by a typical image capturing apparatus, and the processing illustrated in FIG. 3 is merely an example.

FIG. 3 is a diagram illustrating details of the initialization processing performed by the image processing apparatus 100 in step S100. In step S101, the CPU 130 executes input/output initialization processing. Here, the CPU 130 initializes the operation input unit 150, the image output unit 180, the display unit 190, or the like to prepare the input/output of the image processing apparatus 100. In step S102, the CPU 130 performs image capture initialization processing. Here, the CPU 130 initializes the image sensor 120 and the image capturing control unit 121, and sets the image sensor 120 to an exposable state.

In step S103, the CPU 130 performs lens initialization processing. Here, the CPU 130 initializes the lens 110 and the lens control unit 111 to put those elements into a state where lens operations by the operation input unit 150 or lens control processing through AF (described later) can be executed. In step S104, the CPU 130 performs NR initialization processing. Here, the CPU 130 reads out the parameters of a trained NN, which has been trained in advance, as initial settings for the NR processing executed by the image signal processing unit 170.

Figure 4:
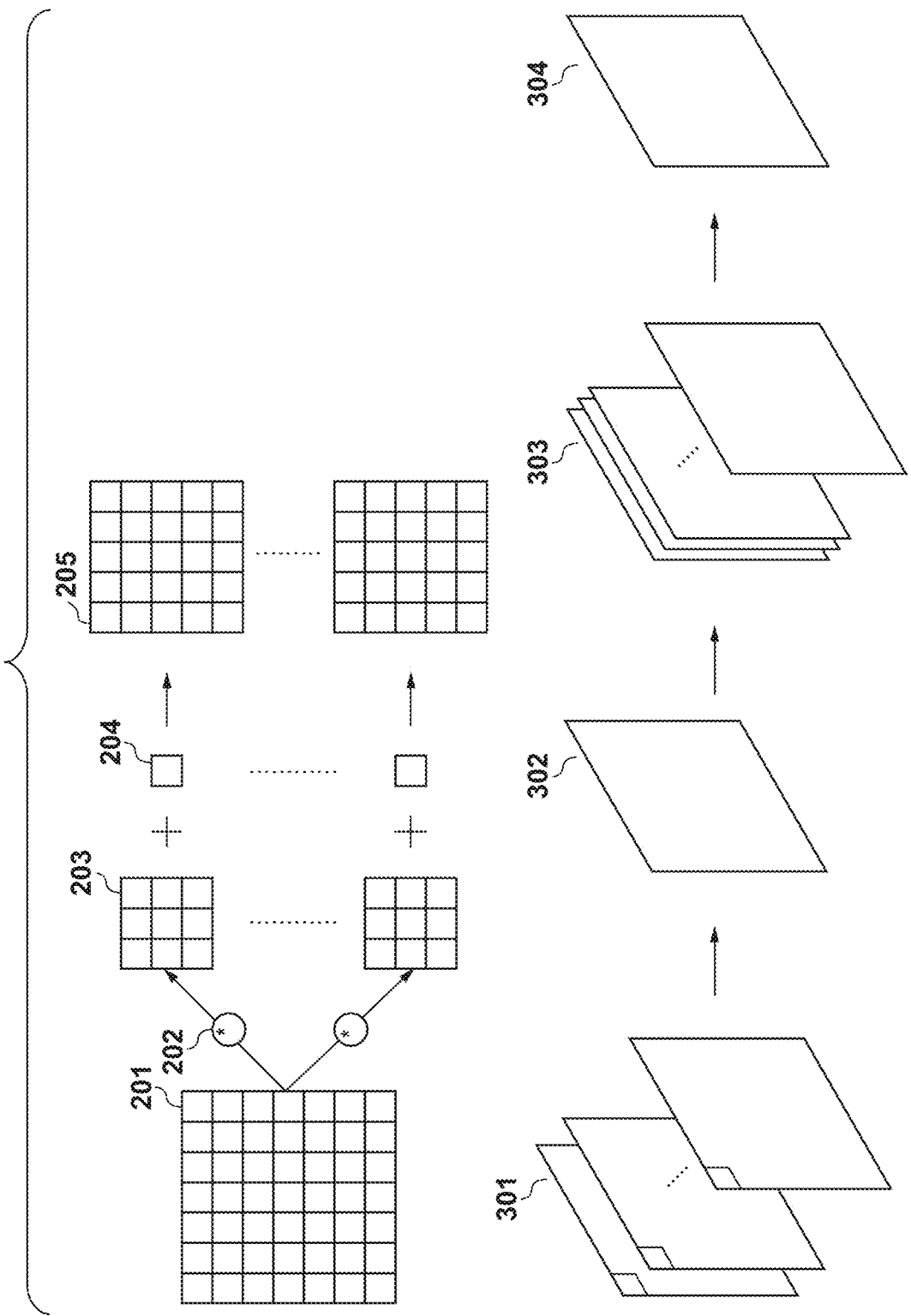
FIG. 4 is a diagram illustrating a neural network according to the first embodiment.

The NN read out to the image signal processing unit 170 will be described here with reference to FIG. 4. FIG. 4 is a diagram illustrating NN output for an input image. Although FIG. 4 illustrates a case where a convolutional NN ("CNN" hereinafter) is used as the NN, the processing is not limited thereto as long as the same processing can be performed. For example, a Generative Adversarial Network (GAN) or the like may be used as the NN, or an NN having skip connections may be used as the NN. The NN may also be a recursive type such as a Recurrent Neural Network (RNN) or the like.

In FIG. 4, an input image 201 represents an image or a feature map (described later) input to the NN. Operation 202 represents a convolution operation. A convolution matrix 203 is a filter that performs a convolution operation on the input image 201. Bias 204 is a value added to the result output by the convolution operation 202 of the input image 201 and the convolution matrix 203. A feature map 205 is a convolution operation result from after the bias 204 has been added. The neurons, intermediate layers, and numbers of channels in FIG. 4 are merely examples, and the number of neurons and layers, the numbers or weights of connections among the neurons, and the like are not limited to this example. In addition, when the NN illustrated in FIG. 4 is implemented in an FPGA, an ASIC, or the like, the connections or weights among the neurons may be reduced.

In the CNN, a feature map of the input image is obtained by executing convolution operations on the input image using a given filter. In the present embodiment, the size of the filter can be set as desired. In the next filter, a different feature map is obtained by executing convolution operations on the feature map of the previous layer using a different filter. In addition, in each layer, the input signal is multiplied by the filter to calculate the sum of the biases. The output signal from each neuron is then obtained by applying an activation function to the calculated value. Here, the weights and biases in each layer are called "NN parameters", and processing for updating the values thereof (the network parameters) is performed in training. Although a sigmoid function, a ReLU function, or the like can be used as the activation function, for example, the present invention is not particularly limited thereto. The CPU 130 according to the present embodiment can use the Leaky ReLU function represented by the following Formula (1) as the activation function, for example. Note that in Formula (1), "max" represents a function that outputs the maximum value of the arguments.

$$f(x) = \max(x, x \times 0.2) \qquad \text{Formula (1)}$$

In pre-training for obtaining the NN parameters, training is performed using an image having the noise characteristics of the image processing apparatus 100 and the image sensor 120 as an unlabeled image, and an image which does not have the noise in the unlabeled image as a labeled image. In other words, NR is implemented by performing training such that a labeled image having no noise can be output by using an unlabeled image having noise characteristics as an input.

The image processing apparatus 100 according to the present embodiment generates, from a captured image, an attention map used by the NN, which performs inference through an attention mechanism which uses attention layers, based on a spatial frequency. The image processing apparatus 100 then outputs an inference image, in which the noise has been reduced from the input image by an NN that has been trained to generate an image in which the noise has been reduced from the image based on the captured image and the attention map. Here, the attention map (mask) is generated so as to focus on a region outside a high-frequency region determined to have a high spatial frequency, and the NN is trained such that the noise reduction rate of the NR is further improved for the region outside the high-frequency region. Although an example of NN performing inference using such an attention mechanism will be described hereinafter, the configuration is merely an example, and is not limited to the following configuration as long as the reduction of noise by the NR in a region of interest can be enhanced through a publicly-known attention mechanism technique. For example, a map indicating a region having a specific spatial frequency in the captured image (a region excluding a high-frequency region) is generated as the attention map. In other words, a map indicating a region having a spatial frequency that is lower than a predetermined frequency is generated.

The above-described feature map 205 has features indicating the noise in the input image, and by convolving another feature map (an attention map) therewith, training in which a region of interest has been set can be performed in addition to the training pertaining to noise. For example, the input image 201 is divided into channels on a color-by-color basis to obtain input images 301, an intermediate layer 302 is a layer in which the input images 301 are averaged in the channel direction, and an intermediate layer 303 is an intermediate layer in which a plurality of convolutions are performed as indicated by Formula (1). Next, an attention layer 304 is a layer in which convolution is performed such there is one output channel. The attention layer 304 according to the present embodiment is an intermediate layer in which a feature amount appears in a noise region excluding a high-frequency component of a subject in an input image. Convolving the attention layer 304 together with the above-described feature map 205 makes it possible to generate an NN in which the NR is executed focusing on a region in the input image 201 or the input images 301 in which the high-frequency region is excluded from the spatial frequency. Accordingly, the amount of noise in the region outside the subject can be reduced by assuming the region in which the subject is present is the high-frequency region and selectively performing NR outside the high-frequency region. In addition, since the NR is performed selectively outside the high-frequency region, flattening of the high-frequency region (and a corresponding drop in the contrast of the image), which is a drawback of NR using an NN, can be prevented. Note that the attention layer 304 according to the present embodiment is assumed to be configured within the NN.

The descriptions will now return to FIG. 3. In step S105, the CPU 130 performs initialization processing for the image signal processing performed by the image signal processing unit 170. The image signal processing unit 170 performs initialization processing in order to execute white balance processing, development processing, and the like, in addition to the NR initialization processing in step S104. In step S106, the CPU 130 initializes (turns oft) an in-focus flag, which is used in focus detection processing (described later). After step S106 is executed, the subroutine of step S100 ends, and the sequence moves to step S110 in FIG. 2.

Figure 5:
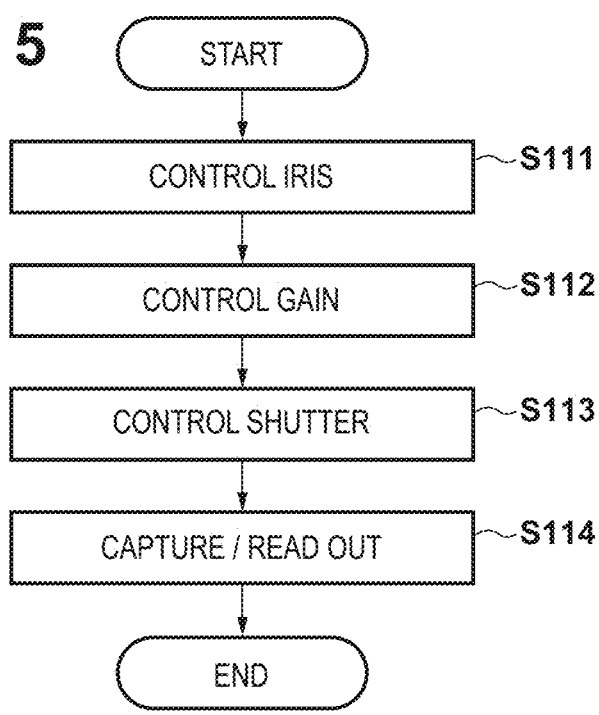
FIG. 5 is a flowchart illustrating an example of image capture processing according to the first embodiment.

In step S110, the CPU 130 performs image capture processing. The subroutine of step S110 is illustrated in FIG. 5. The processing involved in step S110 can use any publicly-known image capture processing performed by a typical image capturing apparatus, and the processing illustrated in FIG. 5 is merely an example.

In step S111, the CPU 130 performs iris control of the lens 110 through the lens control unit 111 in response to an operation input through the operation input unit 150. In step S112, the CPU 130 controls the gain applied to the image signal read out from the image sensor 120 through the image capturing control unit 121. In step S113, the CPU 130 performs shutter control, i.e., exposure control, of the image sensor 120 through the image capturing control unit 121. In step S114, the CPU 130 reads out the image signal from the image sensor 120 and stores the read-out image signal in the memory 140 as image data.

FIGS. 13A and 13B illustrate examples of the image signal according to the present embodiment. FIG. 13A illustrates an image captured at a low gain, corresponding to normal camera settings, in a low-light environment, which is assumed to be the image capturing environment according to the present embodiment. FIG. 13B illustrates an image in which the brightness of the image signal has amplified using a gain higher than the gain in FIG. 13A, and the image therefore contains a large amount of noise. After step S114 is executed, the subroutine of step S110 ends, and the sequence moves to step S120 in FIG. 2. Note that the processing illustrated in FIG. 5 can be performed using a general image capturing technique, and will therefore not be described in detail here. Additionally, the image capture processing in step S110 may be performed in a different manner as long as image capture processing involving gain control is performed in the same manner.

Figure 6:
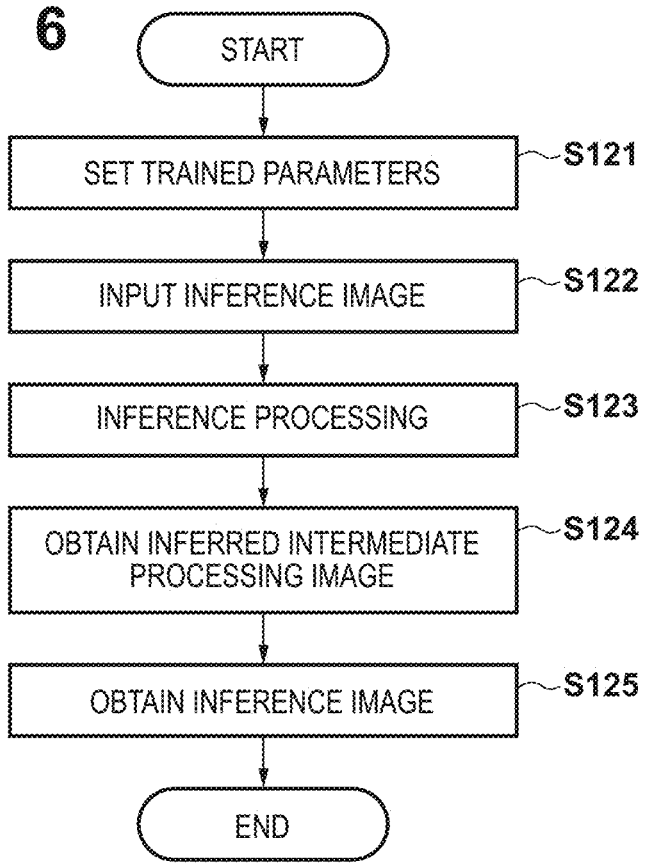
FIG. 6 is a flowchart illustrating an example of noise reduction processing according to the first embodiment.

In step S120, the CPU 130 performs NR processing. The subroutine of step S120 is illustrated in FIG. 6. In step S121, the CPU 130 sets the trained NN parameters in accordance with the gain controlled by the image capturing control unit 121 in step S112. Here, the NN parameters are set such that the above-described NN read out by the image signal processing unit 170 has the appropriate NN parameters trained in accordance with the gain value of the input image signal.

In step S122, the CPU 130 obtains an input image for performing inference processing, or in other words, NR processing, using the NN. Here, the CPU 130 obtains the input image by reading the input image out from the memory 140. In step S123, the CPU 130 executes inference processing on the input image. As described earlier, in the inference processing performed by the image processing apparatus 100 according to the present embodiment, the inference image in which the noise is reduced by the NN, and the attention layer 304, are respectively obtained and stored in the memory 140. FIG. 13C illustrates an image in which noise has been reduced through the inference processing of the NN, using the image in FIG. 13B, which contains a large amount of noise, as an input.

In step S124, the CPU 130 reads out an intermediate processing image corresponding to the attention layer 304 stored in the memory 140. In step S125, the CPU 130 reads out the inference image stored in the memory 140 from the memory 140, after which the subroutine of step S120 ends and the sequence moves to step S130 in FIG. 2.

Figure 7:
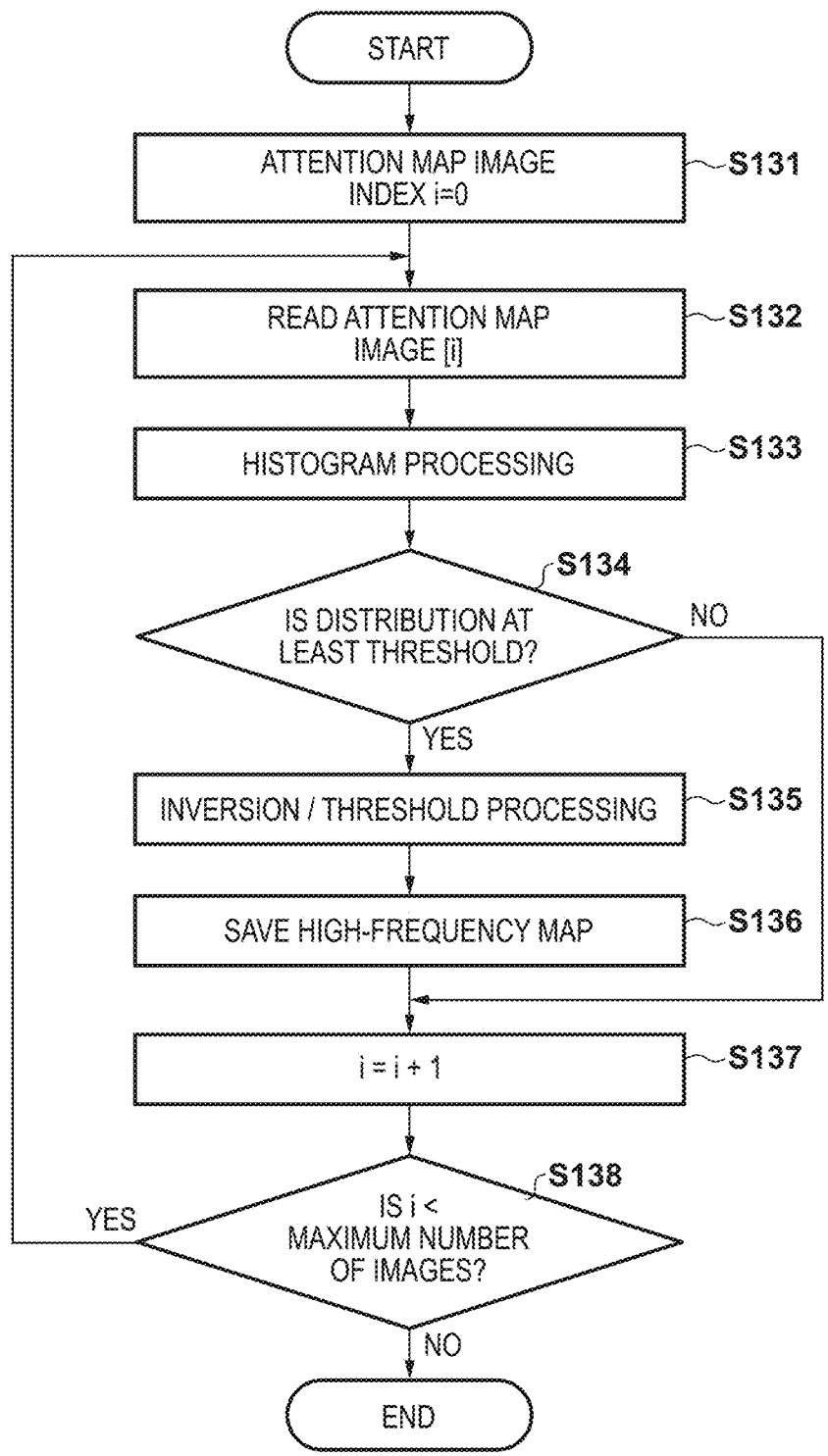
FIG. 7 is a flowchart illustrating an example of attention map processing according to the first embodiment.

In step S130, the CPU 130 performs attention map processing. The attention map processing according to the present embodiment is processing for extracting an intermediate layer in which features appear in a high-frequency region, using the plurality of attention layers 304 included in the NN according to the present embodiment. The subroutine of step S130 is illustrated in FIG. 7.

In step S131, the CPU 130 resets an index i, which is used to set one of the plurality of attention layers 304 as a processing target, to 0. The processing from steps S132 to S138 that follow thereafter is a loop, and the attention layers 304 are referenced in order according to the index i. In step S132, the CPU 130 reads out the attention layer 304 from the memory 140. The CPU 130 performs publicly-known histogram processing on the image of the attention layer 304 read out in step S133, and in step S134, determines whether a distribution is at least a given threshold. The threshold used in step S134 can be set in advance by the user, such as when training the NN in advance. Here, the threshold is a value used to determine whether a high-frequency region is present.

If the distribution is at least the given threshold in step S134, the sequence moves to step S135, where the feature that the attention layer 304 includes the high-frequency region is determined to be present. If not, the sequence moves to step S137, where the feature of the high-frequency region is determined not to be present. FIG. 13D illustrates the attention layer 304 when the determination in step S134 is false (No), and FIG. 13E illustrates the attention layer 304 when the determination in step S134 is true (Yes). In the image illustrated in FIG. 13E, the brightness levels of an edge part and a face part of the subject (here, a person) are low (dark), and the brightness level of the background is high (bright). In the present embodiment, a region having a high brightness level is determined to be the background, and a region having a low brightness level is determined to be a region in which the feature of the high-frequency region is determined to be present. The image processing apparatus 100 according to the present embodiment can suppress situations where the inference image blurs due to the NR by suppressing the amount by which the noise is reduced through the inference processing in the region in which a feature including a high-frequency region is determined to be present. Additionally, performing the NR while focusing on a region outside the high-frequency region makes it possible to increase the amount of noise reduction in such a region outside the high-frequency region, which in turn makes it possible to increase the focus accuracy even in noisy images of low-light environments.

In step S135, the CPU 130 performs brightness inversion processing and threshold processing on the attention layer 304 being processed, and obtains a high-frequency map. Here, the region in which the brightness is originally low is the high-frequency region, and thus by performing the brightness inversion processing, an image of the attention layer 304 is obtained in which the high-frequency region is converted to a region having a high brightness level and the low-frequency region (the region where strong NR has been applied) is converted to a region having a low brightness level. The high-frequency map illustrated in FIG. 13F is obtained as a result of performing predetermined threshold processing on the image after the brightness inversion processing. The high-frequency map according to the present embodiment is an image indicating a region from which a high-frequency component of a subject has been extracted from a noisy image. In step S136, the CPU 130 stores the high-frequency map obtained in step S135 in the memory 140.

In step S137, the CPU 130 increments the index i used to reference the attention layer 304. In step S138, the CPU 130 determines whether all the plurality of attention layers 304 have been processed. If not, the sequence returns to step S132, and if so, the subroutine of step S130 ends and the sequence moves to step S140 in FIG. 2.

In step S140, the CPU 130 determines whether the image processing apparatus 100 is currently performing AF operations based on the input to the operation input unit 150. It is assumed here that the AF operation is turned on and off by operating a switch. If AF operations are currently underway, the sequence moves to step S150, and if not, the sequence moves to step S170.

The image processing apparatus 100 according to the present embodiment generates information for adjusting the focus of the image capturing, based on the image and the generated attention map. For example, when performing AF, the image processing apparatus 100 can set a partial region in the captured image in which AF focus detection is to be performed (a focus detection region) based on the high-frequency map, and then perform AF from the set focus detection region. Additionally, for example, when performing MF, the image processing apparatus 100 can generate an assist image that emphasizes the high-frequency part by overlaying the assist image on the inference image after the NR, based on the high-frequency map. Here, the assist image is assumed to be, for example, an image in which a predetermined color is added to the region indicating the high-frequency part. The predetermined color can be set as desired, and the transparency of the assist image can also be set as desired. Focus processing using such information for adjusting the focus will be described hereinafter as steps S150 to S160 for AF, and as steps S170 to S180 for MF.

Figure 8:
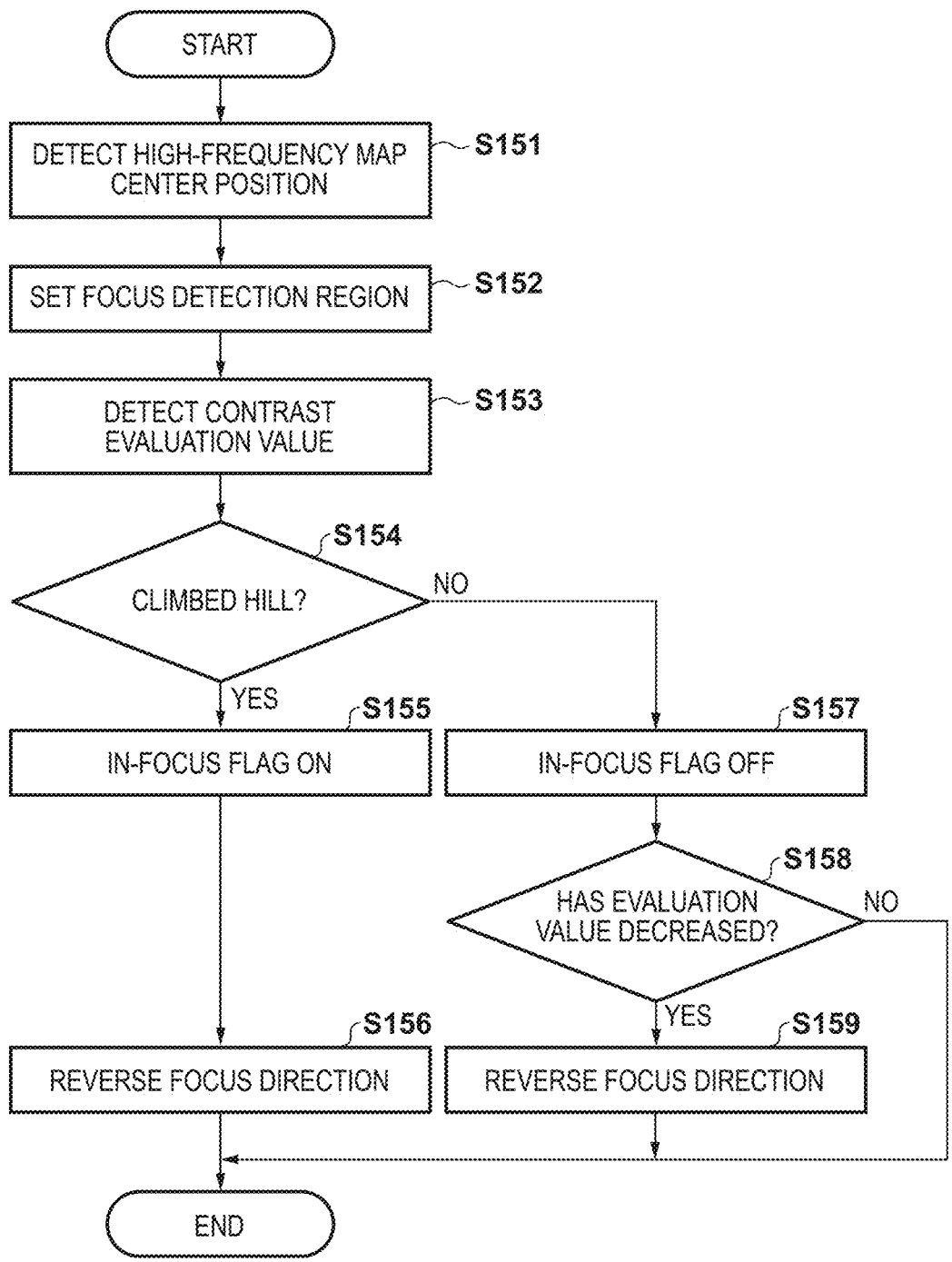
FIG. 8 is a flowchart illustrating an example of focus detection processing according to the first embodiment.

In step S150, the CPU 130 performs focus detection processing. The subroutine of step S150 is illustrated in FIG. 8. For example, the image processing apparatus 100 according to the present embodiment can set a predetermined region centered on the center position of the high-frequency map as the focus detection region. The region assumed to be the subject in the high-frequency map is expressed as a high-frequency region, and thus setting the focus detection region in this manner makes it possible to efficiently search out the subject of the AF and increase the accuracy of the AF. Although AF processing performed using a contrast-based method from the focus detection region will be described hereinafter, but this is merely one example, and the processing is not limited thereto as long as AF can be performed in the focus detection region.

In step S151, the CPU 130 detects the center position of the high-frequency map stored in step S136. In step S152, the CPU 130 sets a predetermined region, which is set based on the center position detected in step S150, as the focus detection region. Here, a predetermined region centered on the center position (e.g., a circular or rectangular region) is used as the focus detection region. The size of the focus detection region can be set as desired.

In step S153, the CPU 130 calculates a contrast evaluation value from the high-frequency component of the inference image obtained in step S125, which corresponds to the set focus detection region. In step S154, the CPU 130 determines the focus using a publicly-known contrast-based method (hill climbing determination), viewing the calculated contrast evaluation value in the frame direction. In the following, the term "evaluation value" will be assumed to refer to such a contrast evaluation value.

Figure 9A:
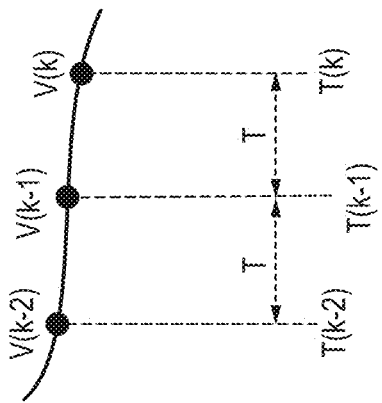
FIGS. 9A, 9B, and 9C are diagrams illustrating determination using contrast evaluation values according to the first embodiment.
Figure 9B:
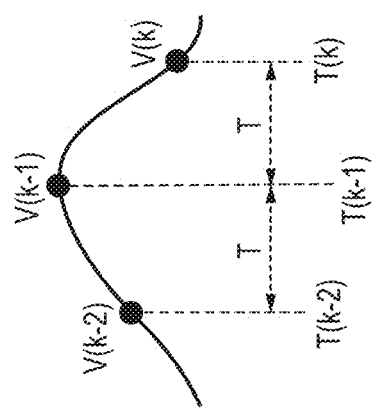
Figure 9C:
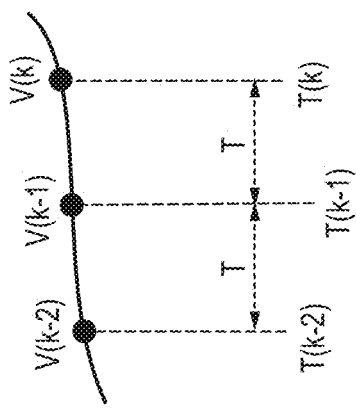

FIGS. 9A to 9C are diagrams illustrating examples of evaluation value trajectories in the hill climbing determination. In FIGS. 9A to 9C, an evaluation value V(k) is the evaluation value at a current frame T(k), an evaluation value V(k−1) is the evaluation value one frame previous (T(k−1)), and an evaluation value V(k−2) is the evaluation value two frames previous (T(k−2)). As indicated in FIG. 9A, when the evaluation value is trending upward as time passes, the focus can be determined to be moving toward being in focus. Additionally, as indicated in FIG. 9B, when a peak contrast value (here, T(k−1)) is obtained in the observation range (here, T(k−2) to T(k)), it is determined that the image is in focus as a result of the hill climbing determination. However, as indicated in FIG. 9C, when the evaluation value is trending downward as time passes, the focus can be determined to be moving away from being in focus.

If it is determined in step S154 that the image is in focus (that the hill has been climbed), the sequence moves to step S155, where the in-focus flag is set to "on". Next, in step S156, the CPU 130 reverses the focus direction to return to the focus position that was the peak of the hill climbing, after which step S150 ends, and the sequence then moves to step S160.

If it is determined in step S154 that the image is not in focus (that the hill has not been climbed), the sequence moves to step S157, where the in-focus flag is set to "off". In step S158, the CPU 130 determines whether the evaluation value is trending downward over time, as indicated in FIG. 9C, for example. If the value is trending downward, the CPU 130 moves the sequence to step S159, where the focus direction is reversed, after which step S150 ends and the sequence moves to step S160. If the value is not trending downward, the CPU 130 ends step S150 and moves the sequence to step S160.

In step S160, the CPU 130 sets an AF target value. Here, the AF target value is assumed to be a value indicating the next control position of the focus lens in the AF. The subroutine of step S160 is illustrated in FIG. 10. In step S161, the CPU 130 determines whether the set in-focus flag is on or off. If the in-focus flag is on, the sequence moves to step S162, whereas if the in-focus flag is off, the sequence moves to step S163. In step S162, the CPU 130 sets the peak position of the evaluation value, which corresponds to V(k−1) detected in FIG. 9B, as the AF target position, or in other words, the next control target position of the focus lens, after which step S160 ends and the sequence moves to step S190.

In step S163, the CPU 130 determines whether the evaluation value detected in S153 is greater than the threshold α. If so, the sequence moves to step S164, and if not, the sequence moves to step S165. Here, a can be set as any desired value.

In step S164, the CPU 130 sets the AF target position as a focus step amount A. In step S165, the CPU 130 sets the AF target position as a focus step amount B. Here, although the values of A and B can be set as desired, it is assumed that in step S164, the evaluation value is determined to be closer to the in-focus position due to the evaluation value being greater than a, whereas in step S165 the evaluation value is determined to be farther from the in-focus position, and A is therefore set to be less than B. Once step S164 or step S165 has ended, step S160 ends and the sequence moves to step S190. In step S190, the CPU 130 controls the focus lens to the set AF target position.

In S170, which is processing performed when it is determined in S140 that AF operations are not currently underway, the CPU 130 performs overlay processing for the MF assist image. The subroutine of step S170 is illustrated in FIG. 11.

In step S171, the CPU 130 reads out the high-frequency map stored in step S136 from the memory 140. In step S172, the CPU 130 reads out the inference image stored in step S125 from the memory 140. In step S173, using the image signal processing unit 170, the CPU 130 performs processing for overlaying the high-frequency map read out in step S171 on the inference image read out in step S172, and displays the image after the overlay (the overlaid image) in the display unit 190. Note that instead of the display unit 190, the overlaid image may be output to the exterior of the image processing apparatus 100 through the image output unit 180 and displayed in an external apparatus. The sequence of step S170 ends when step S173 ends, and the sequence then moves to step S180.

FIG. 13G illustrates an example of the overlaid image in which a high-frequency map is overlaid on an inference image. In FIG. 13G, the high-frequency map illustrated in FIG. 13E has been overlaid on the inference image illustrated in FIG. 13C, and thus an image is obtained in which the edges of the subject are emphasized such that the user can more easily grasp the state of focus.

In step S180, the CPU 130 sets an MF operation amount. The subroutine of step S180 is illustrated in FIG. 12. In step S181, the CPU 130 obtains an amount by which the focus demand, which corresponds to the operation input unit 150, is operated by the user. In step S182, the CPU 130 sets a focus step amount C, which is a difference between the obtained operation amount and the current focus lens position, as the next focus lens control target position (AF target position). Although the focus step amount C can be set to any desired value, a configuration is desirable is which the focus lens can be controlled in unit amounts sufficiently smaller than the depth of field such that the focus can be adjusted by the user operating the focus demand. The configuration may be such that the sensitivity when converting the focus demand operation amount to the focus step amount C can be set according to an operation amount per unit of time, an operation time, or the like. The subroutine of step S180 of FIG. 2 ends when step S182 ends, and the sequence then moves to step S190, where the focus lens is controlled to the set AF target position. Once step S190 is executed, the sequence returns to step S110, and the loop is repeated.

According to this processing, an inference image in which noise is reduced can be output by a machine learning model including an attention layer. Additionally, the information for adjusting the focus of the image capturing apparatus can be generated based on the attention map of the attention layer. Particularly when performing AF, of the output images inferred by the NN, using contrast information of a high-frequency prediction region based on the attention map extracted in the inference makes it possible to execute autofocus through a contrast-based method, even for high-noise images captured in low-light environments.

Second Embodiment

An image processing apparatus 101 according to a second embodiment will be described hereinafter. The first embodiment described the image processing apparatus 100 as performing AF using a contrast-based method when performing AF processing. The image processing apparatus 101 according to the present embodiment performs AF through phase detection AF, from an inference image in which NR processing is performed using the same NN as that described in the first embodiment.

Figure 14:
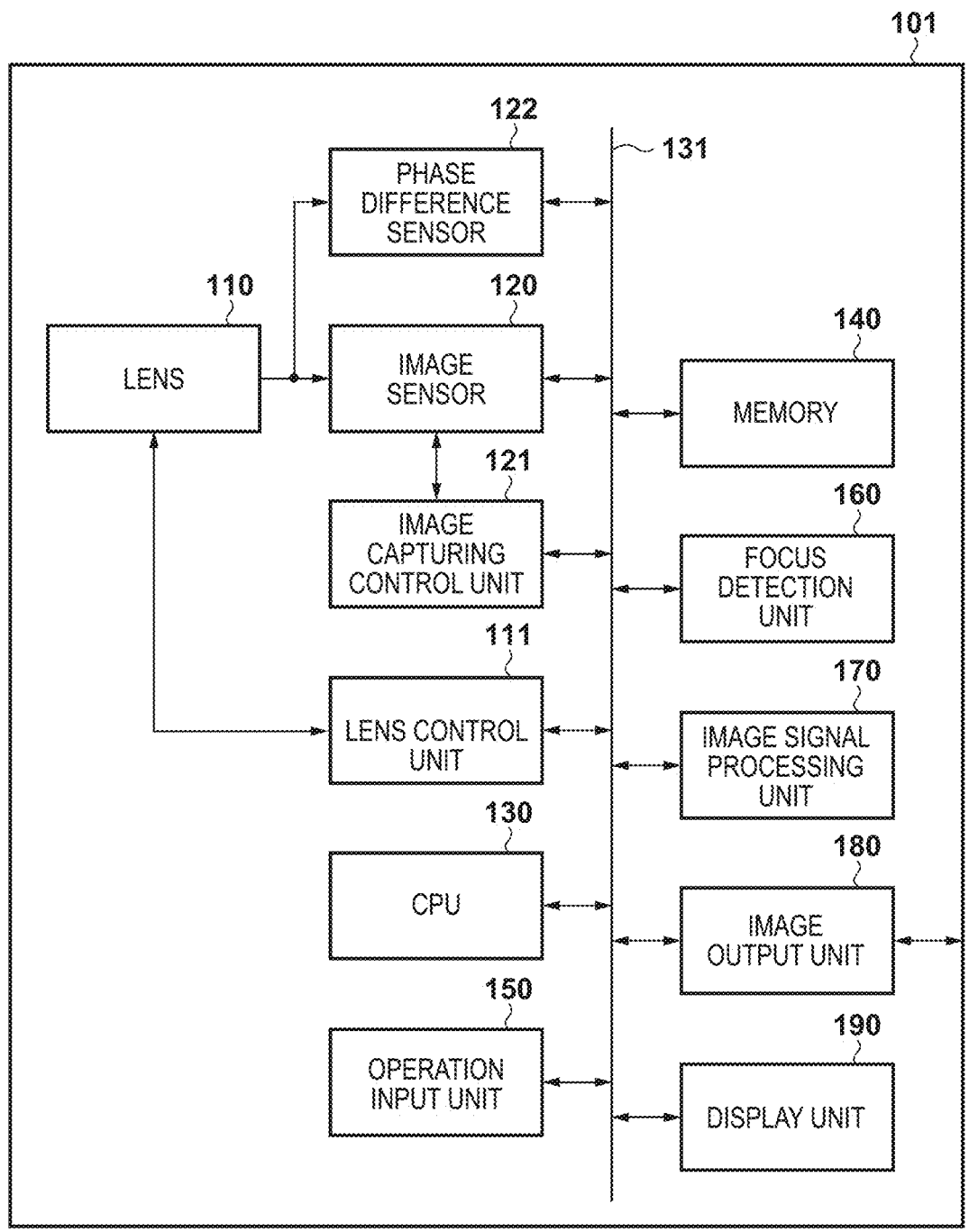
FIG. 14 is a block diagram illustrating an example of the hardware configuration of an image processing apparatus according to a second embodiment.

FIG. 14 is a block diagram illustrating an example of the hardware configuration of the image processing apparatus 101 according to the present embodiment. Aside from additionally including a phase difference sensor 122, the image processing apparatus 101 according to the present embodiment has basically the same configuration as that of the first embodiment, and can perform the same processing. Configurations and processing different from those of the image processing apparatus according to the first embodiment will be described hereinafter.

In the image processing apparatus 101 according to the present embodiment, the image sensor 120 is provided with microlenses, and the pixel structure is such that a light flux incident from the exterior is divided into two images, one for the right eye and one for the left eye, where two images are formed, one for right eye pixels and the other for left eye pixels arranged at positions that are optically at a predetermined baseline length. This structure makes it possible to use the signals from the right eye pixels and the left eye pixels as both captured image signals and as focus detection signals. When the subject is in focus, the two images match, whereas when the subject is out of focus, the two images are shifted. In the present embodiment, the phase difference is calculated, and the AF processing is performed, through a known correlation computation that calculates the amount of shift. The AF processing using the phase detection method can be performed using a publicly-known technique, and will therefore not be described in detail.

The image processing apparatus 101 according to the present embodiment can find a defocus amount, which is a difference between the current focus lens position and the in-focus position, using the zoom lens and iris of the lens 110, as well as lens-specific sensitivity calculations, a sensitivity table, and the like based on the position of the focus lens. In addition to an image signal obtained by adding the two images together, the image for one of the eyes may be output as an image signal, as a captured image signal obtained from the image sensor 120 on which two images are formed in this manner. By finding the difference between the image signal obtained by adding the two images together and the image signal of the image for one eye, the image processing apparatus 101 can obtain the other image signal for focus detection.

Note that in addition to obtaining image signals using a phase detection method, the image processing apparatus 101 can execute each instance of processing using a focus detection sensor separate from the image sensor 120, such as the phase difference sensor 122. The phase difference sensor 122 is disposed in a position optically equivalent to the image sensor 120 using a branching optical system (not shown). The following will describe the image processing apparatus 101 as performing phase difference-based AF using focus detection pixels that branch into two images, both in a configuration in which two images can be formed as described above, and in a configuration using the phase difference sensor 122.

Figure 15:
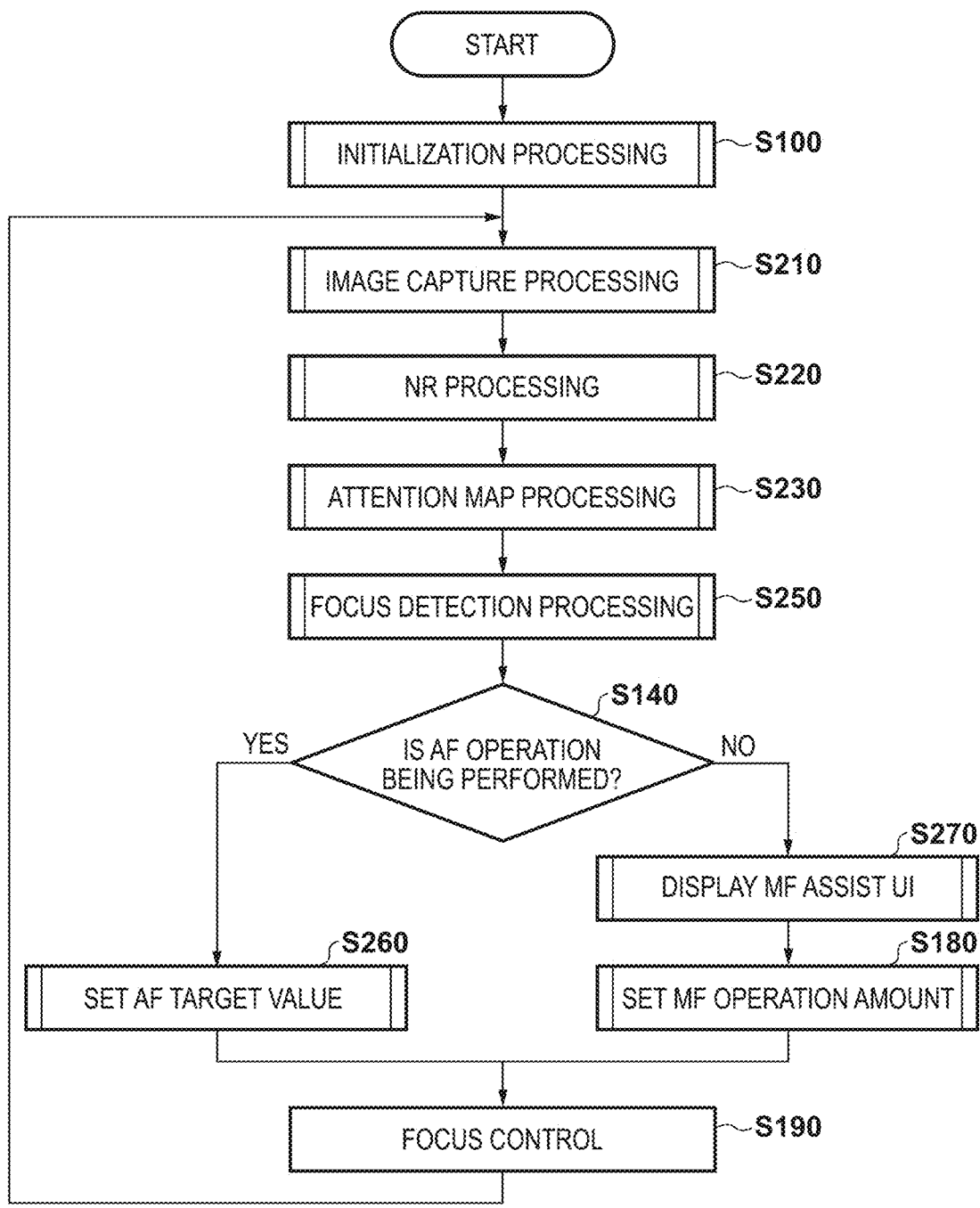
FIG. 15 is a flowchart illustrating an example of overall processing according to the second embodiment.

An example of the processing performed by the CPU 130 of the image processing apparatus 101 will be described next with reference to the flowchart in FIG. 15. The processing illustrated in FIG. 15 can be started in the same manner as the processing illustrated in FIG. 2 and described in the first embodiment, and is executed in order from step S100. Although the processing loop from step S210 starts again once the processing up to step S190 in FIG. 15 is executed, the processing from steps S210 to S190 is performed on a frame-by-frame basis for the image input for processing.

In step S100, the CPU 130 performs initialization processing for the image processing apparatus 101 in the same manner as in step S100 in the first embodiment, and then moves the sequence to step S210.

In step S210, the CPU 130 performs image capture processing. The subroutine of step S210 is illustrated in FIG. 16. The processing involved in step S210 can use any publicly-known image capture processing performed by a typical image capturing apparatus, and the processing illustrated in FIG. 16 is merely an example. Aside from step S215 being further performed after step S114, the processing illustrated in FIG. 16 is the same as the processing illustrated in FIG. 5, and redundant descriptions thereof will therefore be omitted.

In step S215, the CPU 130 generates two images for phase difference computation from the image signal read out in step S114, and stores the images in the memory 140. After step S215 is executed, the subroutine of step S210 ends, and the sequence moves to step S220 of FIG. 15.

In step S220, the CPU 130 performs NR processing. The subroutine of step S220 is illustrated in FIG. 17. Aside from step S226 being further performed after step S125, the processing illustrated in FIG. 17 is the same as the processing illustrated in FIG. 6, and redundant descriptions thereof will therefore be omitted. Note that in FIG. 17, the processing of steps S121 to S226 is performed as a loop for the image of each image signal. In step S226, the CPU 130 determines whether inference for the image signal of each image is complete, in order to obtain an inference image for each of the two image signals. If the inference of the image signal for each image is complete, the subroutine of step S220 ends and the sequence moves to S230. If not, the sequence loops from step S121 in order to perform the inference for the remaining image signal.

Figure 18:
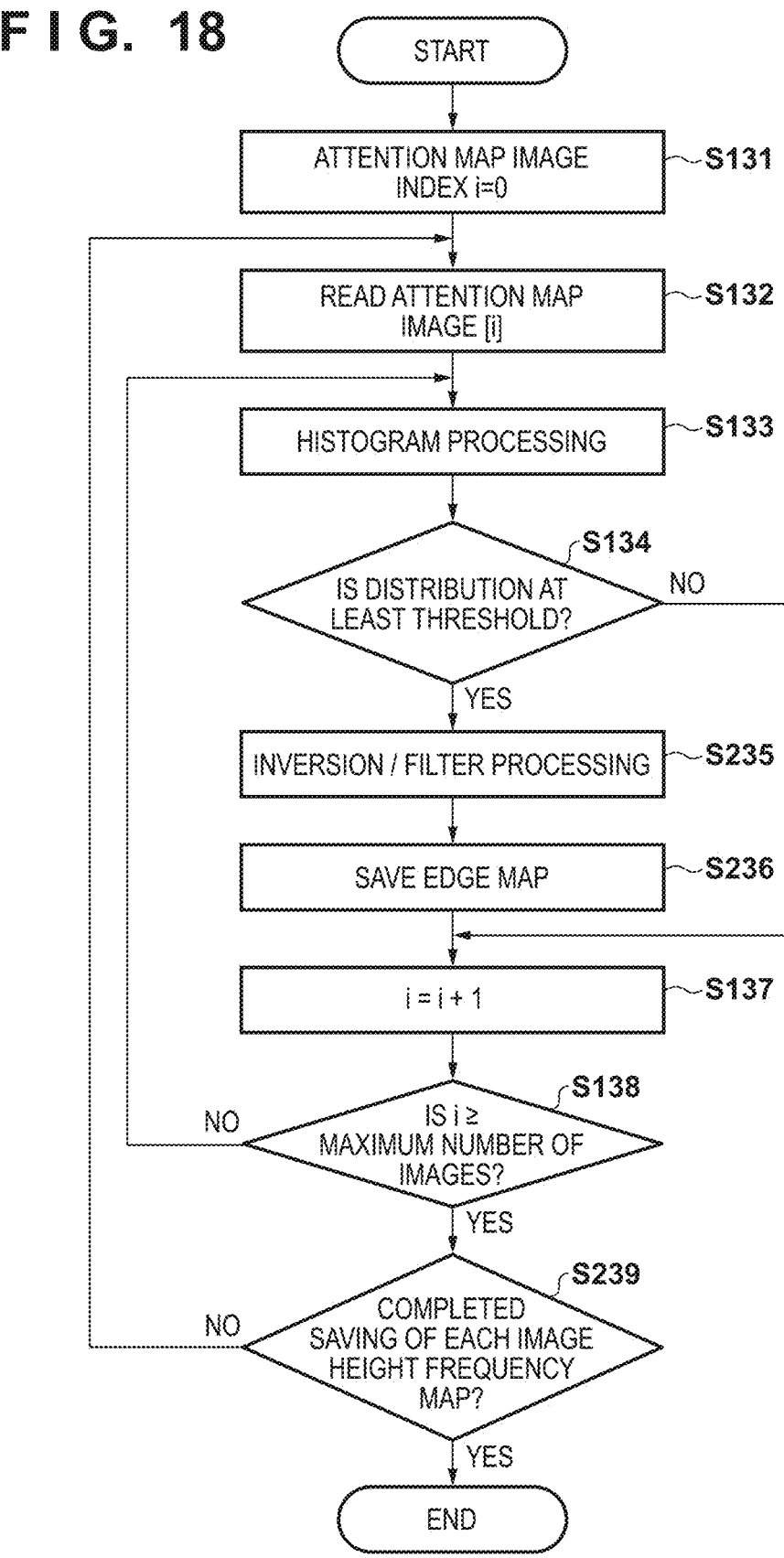
FIG. 18 is a flowchart illustrating an example of attention map processing according to the second embodiment.

In step S230, the CPU 130 performs attention map processing. The subroutine of step S230 is illustrated in FIG. 18. Aside from steps S235 and S236 being performed instead of steps S135 and S136, and step S239 being further performed after step S138, the processing illustrated in FIG. 18 is the same as the processing illustrated in FIG. 7, and redundant descriptions thereof will therefore be omitted. Note that in FIG. 18, the processing of steps S131 to S239 is performed as a loop for the image of each image signal.

Figure 22:
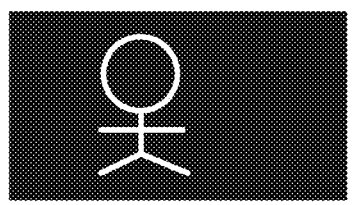
FIG. 22 is a diagram illustrating an example of an edge map according to the second embodiment.

If the distribution is at least the given threshold in step S134, the sequence moves to step S235, where the feature that the attention layer 304 includes the high-frequency region is determined to be present. If not, the sequence moves to step S137, where the feature of the high-frequency region is determined not to be present. In step S235, the CPU 130 performs brightness inversion and edge filter processing on the attention layer 304 being processed, and obtains a high-frequency map. Here, the region in which the brightness is originally low is the high-frequency region, and thus by performing the brightness inversion processing, an image of the attention layer 304 is obtained in which the high-frequency region is converted to a region having a high brightness level and the low-frequency region (the region where strong NR has been applied) is converted to a region having a low brightness level. Furthermore, the CPU 130 can obtain the map illustrated in FIG. 22 as an edge map by executing known filter operation processing, such as edge extraction, on the image of the attention layer 304.

In the first embodiment, the high-frequency map illustrated in FIG. 13F was obtained through threshold processing for obtaining the high-frequency region. However, in the edge map according to the present embodiment, illustrated in FIG. 22, edges are extracted so as to exclude repeating pattern regions from the high-frequency region. Generally, in AF using the phase detection method, if a repeating pattern is present during correlation computations, a correlation amount that results in false focusing may be computed. As such, extracting only the edge region here makes it possible to suppress the occurrence of such false focusing. The coefficients, filter size, and the like used in the edge filter processing for extracting the edge region can be set by the user to desired values according to the window size used in the correlation computation.

In step S235, an image indicating a region from which an edge component of a subject has been extracted from a noisy image is obtained. In step S236, the CPU 130 stores the edge map obtained in step S235 in the memory 140. Steps S137 and S138 are the same processing as in the first embodiment, and the sequence moves to step S239 when it is determined in step S138 that all of the attention layers 304 have been processed. Like FIG. 17, in the processing of FIG. 18, the edge map is obtained for each of the two image signals, and thus in step S239, the CPU 130 determines whether the obtainment of the edge map for the image signal of each image is complete. If so, the subroutine of step S230 ends and the sequence moves to S240, whereas if not, the sequence loops from step S131 in order to perform the inference for the remaining image signal.

Figure 19:
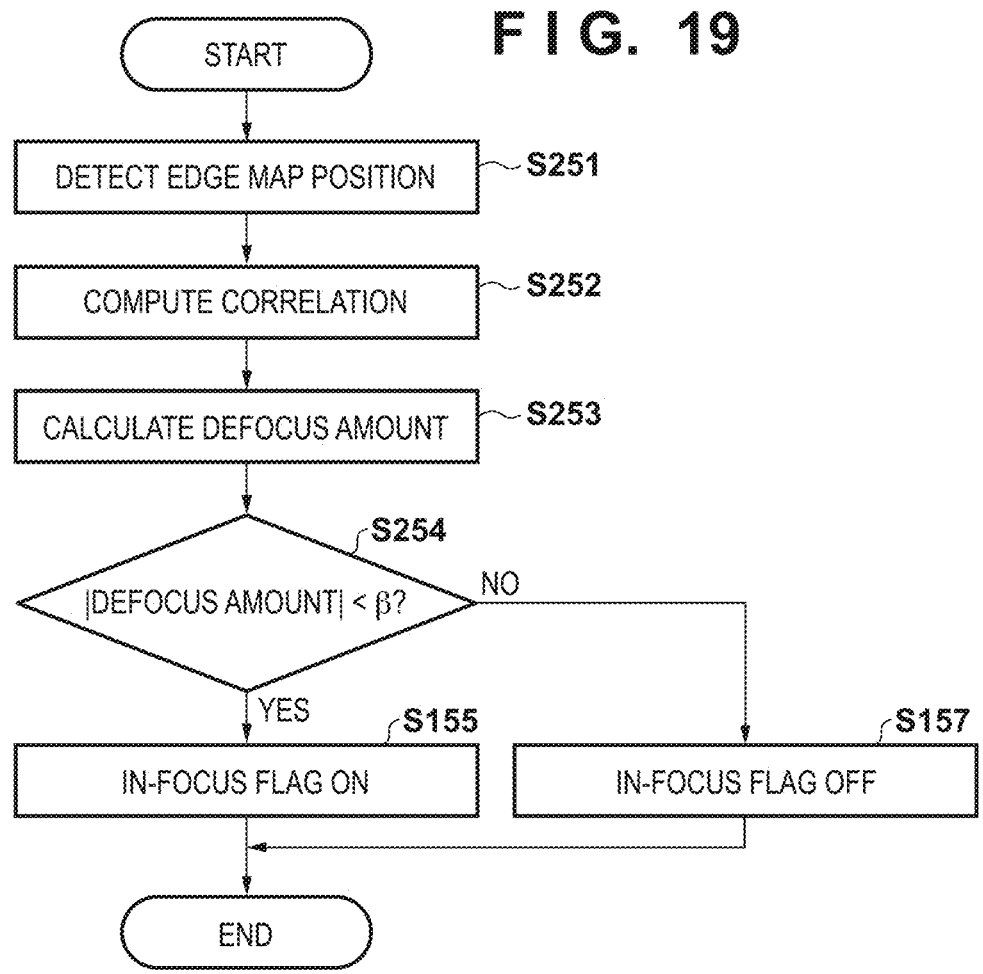
FIG. 19 is a flowchart illustrating an example of focus detection processing according to the second embodiment.

In step S250, the CPU 130 performs focus detection processing. The subroutine of step S250 is illustrated in FIG. 19. Although AF processing performed using a phase detection method from the focus detection region will be described hereinafter, but this is merely one example, and the processing is not limited thereto as long as AF can be performed in the focus detection region.

In step S251, the CPU 130 sets the region including the location where the edge is present from the edge map as the focus evaluation region. In step S252, the CPU 130 calculates a phase difference amount using a known correlation computation in the focus evaluation region set in step S251. In step S253, the CPU 130 calculates a defocus amount from the current focus lens position using the calculated phase difference amount and a sensitivity operation. In step S254, the CPU 130 determines whether the absolute value of the defocus amount is less than a predetermined threshold β. The threshold β is an amount where a condition where the value is no greater than the threshold β can be determined to be in focus, and is assumed to be different depending on the depth of field and the sensitivity determined from the optical conditions of the lens 110. For example, the threshold β according to the present embodiment can be an amount that is half the depth of field. The CPU 130 can also determine whether the focus is forward or rearward according to the sign of the defocus amount.

If the absolute value of the defocus amount is less than the threshold β, the image is determined to be in focus, the sequence moves to step S155, and the in-focus flag is set to "on". If the absolute value of the defocus amount is at least the threshold β, the image is determined to be out of focus, the sequence moves to step S157, and the in-focus flag is set to "off". Once the processing of step S155 or step S157 is complete, the subroutine in FIG. 19 ends, and the sequence moves to step S140.

In step S140, the CPU 130 determines whether the image processing apparatus 100 is currently performing AF operations based on the input to the operation input unit 150. It is assumed here that the AF operation is turned on and off by operating a switch. If AF operations are currently underway, the sequence moves to step S260, and if not, the sequence moves to step S270.

Figure 20:
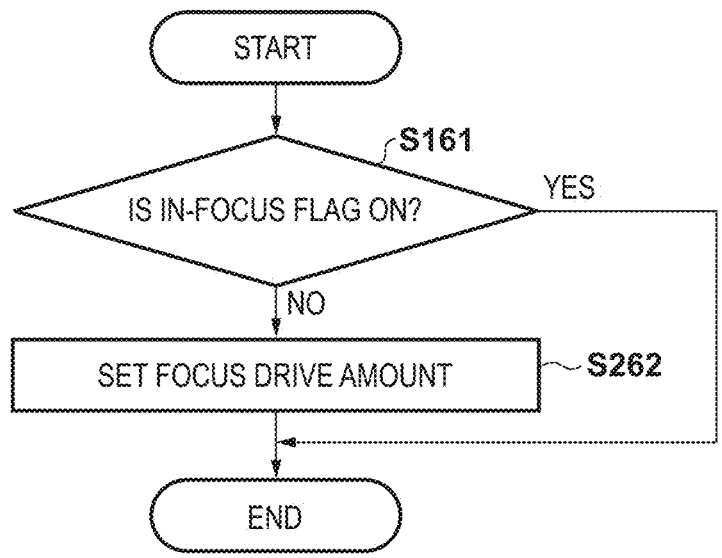
FIG. 20 is a flowchart illustrating an example of AF target value setting processing according to the second embodiment.

In step S260, the CPU 130 sets an AF target value. The subroutine of step S260 is illustrated in FIG. 20. In step S161, the CPU 130 determines whether the in-focus flag set in step S155 or step S157 of FIG. 19 is "on". If the flag is "on", the subroutine in FIG. 20 ends, and the sequence moves to step S190. If the flag is "off", however, the sequence moves to step S262. In step S262, the CPU 130 sets the defocus amount calculated in step S253 as a focus drive amount, after which the subroutine in FIG. 20 ends, and the sequence moves to step S190.

Figure 21:
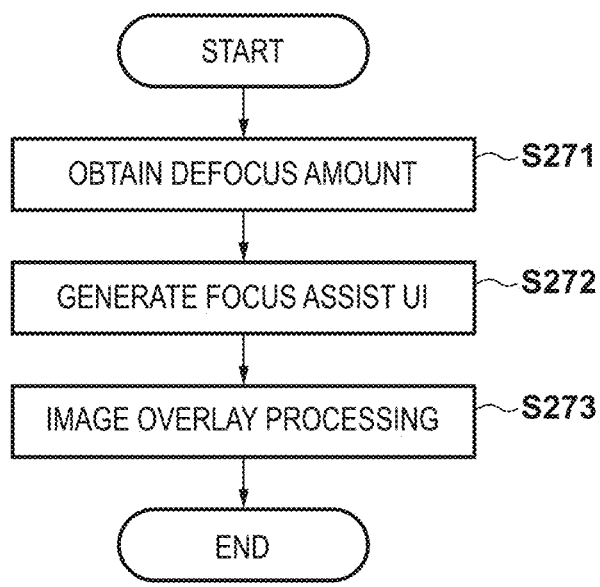
FIG. 21 is a flowchart illustrating an example of MF assist image overlay processing according to the second embodiment.

In step S270, the CPU 130 displays an MF assist UI (assist image). The subroutine of step S270 is illustrated in FIG. 21. In step S271, the CPU 130 obtains the defocus amount calculated in step S253. As described with reference to step S254, the defocus amount can take a positive or negative value, and whether the current focus position is further forward or rearward than the in-focus position can be determined based on the sign of the defocus amount. Furthermore, as the absolute value of the defocus amount increases, the farther from the in-focus position the focus is, i.e., the higher the defocus state is.

In step S272, the CPU 130 generates the assist image for assisting the user in MF operations. The assist image according to the present embodiment may include, for example, information indicating the amount by which the focus lens is to move to be in focus in the MF operations. Such an assist image can be displayed in a known display format. For example, an amount of operation to the in-focus state may be displayed, or a state of being in focus may be indicated by a circle, ±0, or the like. Additionally, a forward focus operation amount may be indicated by a sign such as +, and a rear focus operation amount by a sign such as −, as the assist image. The operation amount may be displayed with signs such as ++ in the case of forward focus and high defocus, or −− in the case of rear focus and high defocus.

In step S273, the CPU 130 overlays the assist image generated in step S272 on the main captured image, and displays the images in the display unit 190 illustrated FIG. 14 or outputs the images to an external apparatus from the image output unit 180. Once the processing of step S273 ends, the subroutine of FIG. 21 ends, and the sequence moves to step S180. Steps S180 to S190 are the same as the processing performed in the first embodiment. In step S190, there are cases where the focus driving is performed using the focus drive amount set in step S260.

Through such processing, of the output images inferred by the NN, an edge map is extracted from a high-frequency prediction region based on the attention map extracted in the inference, and using the phase difference information thereof makes it possible to execute autofocus through a phase detection method, even for high-noise images captured in low-light environments.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-093306, filed Jun. 6, 2023, which is hereby incorporated by reference herein in its entirety.

What is claimed is:

1. An image processing apparatus comprising:
at least one processor; and
a memory coupled to the at least one processor, the memory storing instructions that, when executed by the at least one processor, cause the at least one processor to:
generate an attention map indicating a region having a specific spatial frequency from a first image that is captured by an image capturing apparatus;
output, based on the first image and the attention map, a second image in which noise has been reduced from the first image by using a trained machine learning model; and
generate, based on the second image and the attention map, information for adjusting focus of the image capturing apparatus.

2. The image processing apparatus according to claim 1, wherein as the information for adjusting the focus of the image capturing apparatus, information indicating a first partial region, of the second image, on which focus detection is to be performed through autofocus is generated.

3. The image processing apparatus according to claim 2, wherein the instructions further cause the at least one processor to:
extract a second partial region from the first image based on the spatial frequency,
wherein as the attention map, a map indicating the second partial region in the first image is generated, and
the information indicating the first partial region is generated based on the second partial region in the attention map.

4. The image processing apparatus according to claim 3, wherein the first partial region is a region which has a predetermined shape that is centered on a center position of the second partial region in the attention map.

5. The image processing apparatus according to claim 2, wherein the instructions further cause the at least one processor to:
determine, from the first partial region of the second image, a focal position of the autofocus, the autofocus being performed through a contrast-based method.

6. The image processing apparatus according to claim 2, wherein the instructions further cause the at least one processor to:
determine, from the first partial region of the second image, a focal position of the autofocus, the autofocus being performed through a phase detection method.

7. The image processing apparatus according to claim 3, wherein as the information for adjusting the focus of the image capturing apparatus, an image indicating the second partial region is generated, the image being displayed overlaid on the second image during a manual focus operation.

8. The image processing apparatus according to claim 6, wherein as the information for adjusting the focus of the image capturing apparatus, information indicating an amount of movement for a focus lens to come into focus is generated.

9. The image processing apparatus according to claim 6, wherein as the information for adjusting the focus of the image capturing apparatus, information indicating whether the image capturing apparatus is in focus is generated.

10. An image capturing apparatus comprising:
an image capture device that capture a first image;
at least one processor; and
a memory coupled to the at least one processor, the memory storing instructions that, when executed by the at least one processor, cause the at least one processor to:
generate an attention map indicating a region having a specific spatial frequency, using the first image;
output, based on the first image and the attention map, a second image in which noise has been reduced from the first image by using a trained machine learning model; and
generate, based on the second image and the attention map, information for adjusting focus in image capturing.

11. The image capturing apparatus according to claim 10, wherein the image capture device has a pixel structure in which a light flux incident from outside is split into two images, and each of the two images is formed for focus detection, and
the instructions further cause the at least one processor to:
control autofocus of the image capturing apparatus based on a phase difference between the two images.

12. The image capturing apparatus according to claim 10, further comprising:
- a sensor that detects an in-focus position for the image capture device,
- wherein the instructions further cause the at least one processor to:
- control autofocus of the image capturing apparatus in accordance with an output from the sensor.

13. The image capturing apparatus according to claim 10, wherein the instructions further cause the at least one processor to:
- cause a display device to display the information for adjusting the focus in image capturing.

14. The image capturing apparatus according to claim 13, wherein the instructions further the at least one processor to cause the information for adjusting the focus in the image capturing to be displayed in an apparatus outside the image capturing apparatus.

15. An image processing method comprising:
- generating an attention map indicating a region having a specific spatial frequency from a first image that is captured by an image capturing apparatus;
- outputting, based on the first image and the attention map, a second image in which noise has been reduced from the first image by using a trained machine learning model; and
- generating, based on the second image and the attention map, information for adjusting focus of the image capturing apparatus.

16. An image processing method comprising:
- capturing a first image;
- generating an attention map indicating a region having a specific spatial frequency, using the first image;
- outputting, based on the first image and the attention map, a second image in which noise has been reduced from the first image by using a trained machine learning model; and
- generating, based on the second image and the attention map, information for adjusting focus in image capturing.

17. A non-transitory computer-readable storage medium storing a program that, when executed by a computer, causes the computer to perform an image processing method, the image processing method comprising:
- generating an attention map indicating a region having a specific spatial frequency from a first image that is captured by an image capturing apparatus;
- outputting, based on the first image and the attention map, a second image in which noise has been reduced from the first image by using a trained machine learning model; and
- generating, based on the second image and the attention map, information for adjusting focus of the image capturing apparatus.

18. A non-transitory computer-readable storage medium storing a program that, when executed by a computer, causes the computer to perform an image processing method, the image processing method comprising:
- capturing a first image;
- generating an attention map indicating a region having a specific spatial frequency, using the first image;
- outputting, based on the first image and the attention map, a second image in which noise has been reduced from the first image by using a trained machine learning model; and
- generating, based on the second image and the attention map, information for adjusting focus in image capturing.

* * * * *